United States Patent [19]
Thomas

[11] Patent Number: 5,078,773
[45] Date of Patent: Jan. 7, 1992

[54] REDUCING STRAY LIGHT IN LENSED OPTICAL SYSTEMS

[75] Inventor: Nils I. Thomas, Roanoke, Va.

[73] Assignee: ITT Corporation, New York, N.Y.

[21] Appl. No.: 577,159

[22] Filed: Sep. 4, 1990

Related U.S. Application Data

[62] Division of Ser. No. 233,502, Aug. 18, 1988, Pat. No. 4,989,960.

[51] Int. Cl.$^5$ .................. C03B 32/00; C03C 15/00
[52] U.S. Cl. ........................... 65/37; 65/32.2; 313/534
[58] Field of Search ............. 65/32.1, 32.3, 37; 350/348, 350; 313/534, 571

[56] References Cited

U.S. PATENT DOCUMENTS

| Re. 33,183 | 3/1990 | Holland et al. | 65/36 X |
| 4,118,214 | 10/1978 | Wedding | 65/32.3 X |
| 4,475,059 | 10/1984 | Sink | 313/534 |
| 4,760,307 | 7/1988 | Howorth | 313/371 |

Primary Examiner—Robert L. Lindsay
Attorney, Agent, or Firm—Arthur L. Plevy; Patrick M. Hogan; Peter A. Abruzzese

[57] ABSTRACT

An optical lens has a blackened layer in its outer surface which extends to a depth sufficient to substantially eliminate reflected stray light in the lens. The blackened layer is formed by causing hydrogen under pressure to react for a predetermined time and temperature with a metal oxide of the optical material thereby leaving the metal oxide in its reduced form in the lens. Some of the oxides are reduced completely, leaving the metal in its elemental form in the layer.

23 Claims, 3 Drawing Sheets

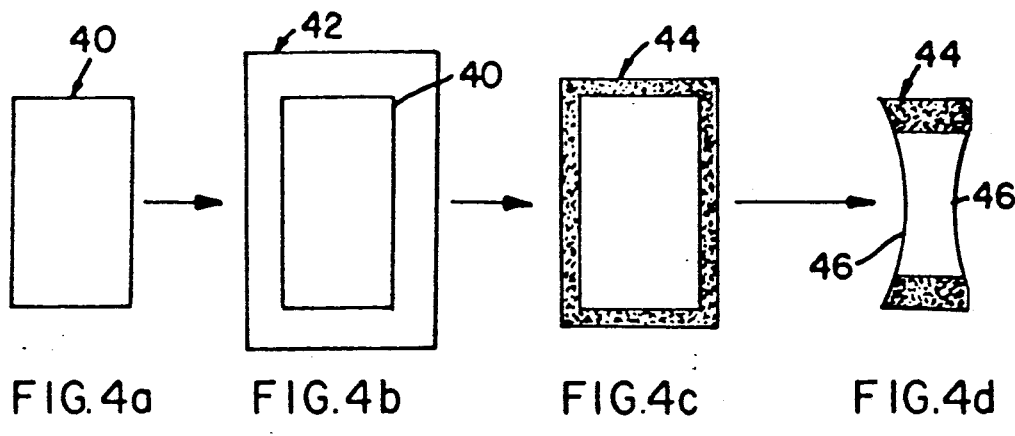
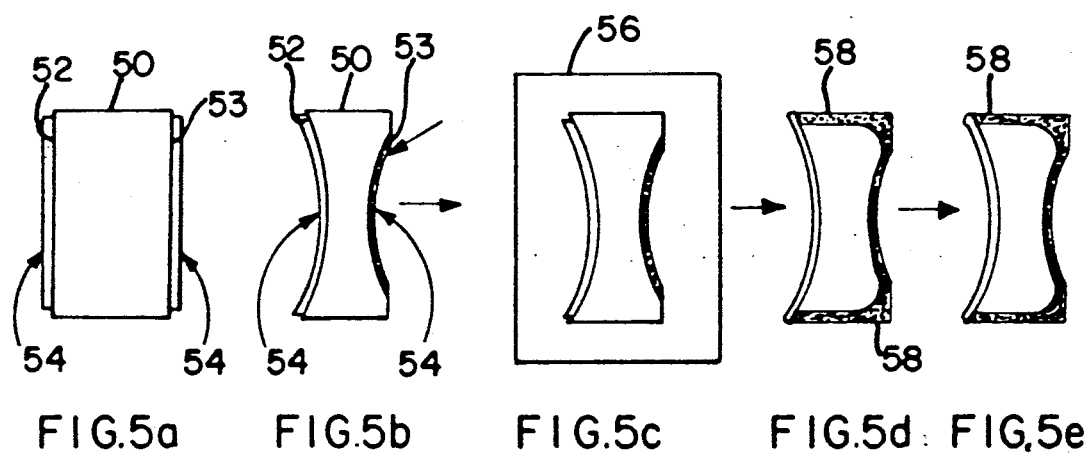
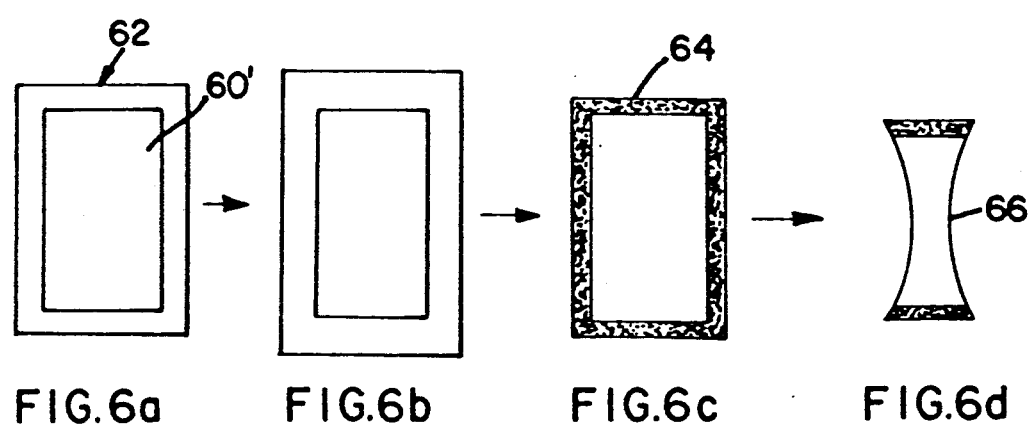

REDUCING STRAY LIGHT IN LENSED OPTICAL SYSTEMS

This is a division of application Ser. No. 07/233,502, filed Aug. 18, 1988, now U.S. Pat. No. 4,989,960.

BACKGROUND AND SUMMARY OF THE INVENTION

This invention relates to lensed optical systems and more particularly to an optical lens having reduced veiling glare. A lensed optical system is a system containing optics that transmit light rather than reflect light.

All optical elements contribute to stray light or "veiling glare". Stray light is any unwanted unimaged light received by a detector in an optical system. In a lensed optical system, stray light can reflect off of the multiple lens elements causing severe imaging problems by decreasing visibility of low contrast objects. For example, in image intensifier tubes, it results in a loss of contrast by filling in the darker portions of the image.

Prior methods of minimizing stray light have been directed to the baffles and surfaces of the optical components and in particular to the outer cylindrical surfaces or edges of the lenses themselves. To reduce scattering from the lens surfaces, the surfaces are usually left with a ground finish and is painted or stained with some sort of ink or enamel. Felt tip markers are frequently used.

These methods have been based on the assumption that photons striking the lens surface will be transmitted into the ink and absorbed. Unfortunately, it has been found that this does not always occur. Minimum reflection amplitude off the glass/ink interface is approximately 4% for normal incidence depending on the glass index of refraction. This is typical Fresnel reflection which does not account for scattering effects. Two parameters increase this reflection amplitude. The first parameter is geometry. Almost all photons impinge the lens edge surface at angles other than normal incidence so that the Fresnel reflection amplitude is higher than 4%; for rays striking the interface at angles greater than the critical angle the reflection becomes 100% off the glass/ink interface. Scattering of photons off of the microstructure, cracks and other defects on the lens surface on an atomic level is the other parameter that will increase the reflection amplitude. Where the interface is ground glass/ink, the reflection amplitude for normal incidence will rise from 4% to approximately 10%.

Another problem arises due to the fact that most inks are highly transmissive in the 600 nm to 1000 nm (red) spectral region. Since absorption is significantly lower than expected, photons are actually transmitted to the mechanical housing in which the lens is mounted, such as a lens barrel, and are scattered throughout the optical system. This is a significant problem for optical systems which operate outside of the 400 nm–700 nm (photovisual) spectral range, such as image intensifiers which work in the red spectrum.

It is therefore an object of the present invention to provide a optical system having reduced light scatter.

It is an addition object of the invention to provide a lens for reducing the incidence of stray light in an optical system.

It is a further object of the invention to provide a method for forming such an optical lens in an easy and economical manner.

These objects and others which will become apparent hereinafter are accomplished by the present invention which provides a lens formed of an optical material. The outer surface of the lens has one portion for receiving light, another portion for transmitting light and the remaining portion for absorbing stray light. The absorbing portion includes optical silica material and a reduced metal oxide which forms a blackened area in the lens.

The present invention also provides a method of reducing stray light in an optical lens by forming a blackened area in the outer surface of an optical material. The blackened area is produced by reducing a metal oxide of the optical material in the outer portion of the lens with hydrogen gas at an elevated temperature and pressure. The reduction causes the oxygen to escape from the metal oxide, leaving the metal oxide in a reduced form to remain in the outer surface of the optical material.

Additional insight into the present invention may be obtained by reference to commonly owned, copending U.S. patent application entitled "Cathode for Image Intensifier Tube Having Reduced Veiling Glare", Ser. No. 233,501, and filed 8/18/88, now U.S. Pat. No. 4,961,025.

BRIEF DESCRIPTION OF THE DRAWINGS

The above-mentioned and other features and objects of the invention will become more apparent by reference to the following description taken in conjunction with the accompanying drawings in which:

FIGS. 4(a)–(d) is a diagrammatic representation of the method of performing the present invention;

FIGS. 5(a)–(e) is a diagrammatic representation of a modification to the method of the present invention;

FIGS. 6(a)–(d) is a diagrammatic representation of another modification of the method of the present invention.

DESCRIPTION OF THE PREFERRED EMBODIMENT

Figure 1:
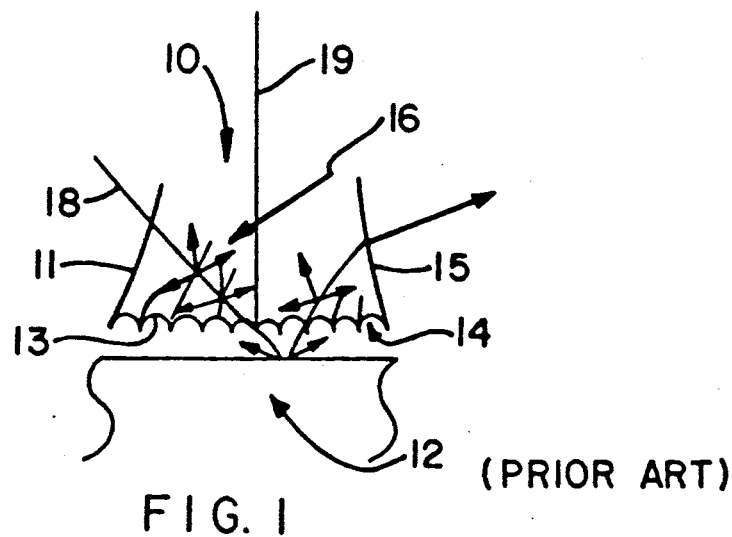
FIG. 1 is a cross-sectional view of a prior art lens with a black ink layer painted on one surface.

FIG. 1 shows a prior art lens arrangement. A lens 10 is situated in a housing or lens barrel 12. The lens 10 has two surfaces which are ground and polished to form light receiving and light transmitting areas 11 and 15 respectively. These surfaces are called the lens radii. The lens 10 has a cylindrical outer surface 13 which has black ink 14 applied thereto. Incoming light rays 18 pass through the light receiving area 11 and are reflected off of the lens barrel 12 and the lens surface 13. Scattering of the photons in the lens 10 from the microscopic structure of the surface 13, from the lens barrel 12 and from other sources in the lens system is indicated at 16. The normal axis is indicated at 19.

Figure 2:
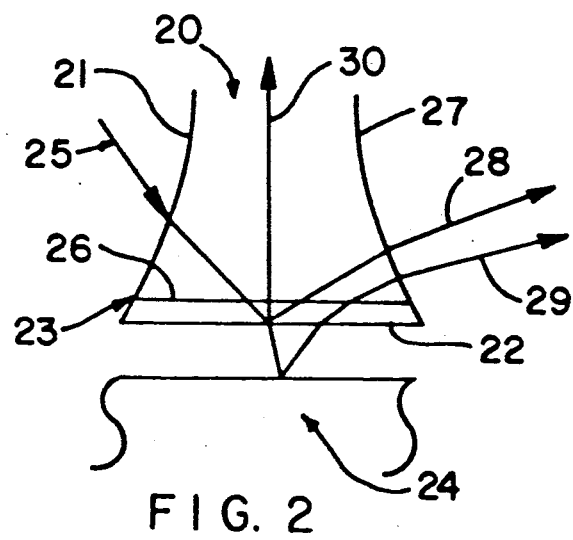
FIG. 2 is a cross-sectional view of a lens of the present invention.

FIG. 2 illustrates a lens 20 of the present invention having an area of blackened optical material 23 formed in an outer cylindrical surface 22. The lens 20 is housed in a lens barrel 24. Incoming light rays 25 enter the lens 20 at a light receiving radius surface 21. Some of the photons striking the outer cylindrical surface 22 will be reflected back into the lens and exit a light transmitting radius surface 27. Some of the photons strike the cylindrical surface 22 and exit the lens. These photons strike the lens barrel 24 and are reflected back into the lens 20 through the layer 23 and pass out of the lens via radius surface 27. The normal axis is shown at 30. No scattering of photons occurs with the lens structure of FIG. 2 due to the presence of the blackened material 23.

In prior art arrangement of FIG. 1, operation in the 850 nm spectral region results in a reflection of anywhere from 4%–100% at the glass/ink interface with transmission and reflection off of the lens barrel 12. The percentage of light being transmitted through the ink 14 is therefore about 96%–0%, and the amount of stray light remaining in the lens system after multiple reflections is in the range of 2.5%–3% for a good lens system.

With the arrangement of FIG. 2, the area of blackened material of this invention reduces total stray light in optical systems to less than or equal to 0.1%. This includes operation of the system in the 600 nm–1000 nm spectral region. In addition, increased absorption of stray light by the blackened material of this invention results in a substantial elimination of photon transmission through the blackened area thus achieving stray light readings which are extremely low—less than or equal to 0.1%.

Figure 3:
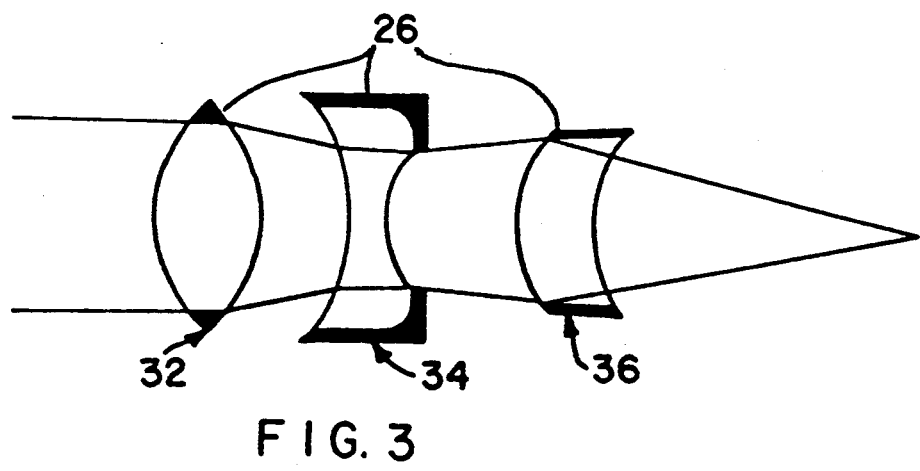
FIG. 3 is a cross-sectional view of different types of lenses which include the reduced stray light feature of the present invention.

FIG. 3 shows three different configurations of lenses 32, 34, 36 which may be included in an optical system, showing the blackened areas 26.

Formation of the blackened area 26 may be performed in a number of ways. A preferred method of forming the area is described below.

Glass is generally opaque to hydrogen diffusion. Controlled formation of an area of blackened material is difficult to achieve since the glass will tend to slump if fired at too high a temperature for too long a time. By this invention it has been found that under certain time, temperature and pressure conditions, diffusion of hydrogen into an area of a glass to a depth sufficient to substantially totally absorb stray light in the glass can be achieved without causing "slumping" of the glass.

Most glass is formed of silicates and has metals added in the form of metal oxides to achieve special optical characteristics. For example, boron may be added to change the refractive index of the glass. Other elements which are added to glass are barium, potassium and sodium. By means of reduction of the metal oxides of the glass by hydrogen gas, the oxygen leaves the glass and the metal is left in its elemental form. In certain instances, some of the oxygen remains combined with the metal, leaving the metal oxide in a reduced form. It is the metal which causes the glass to become discolored or blackened. The discoloration or blackening varies with the base glass composition. The glass matrix is actually changed by the hydrogen reduction.

The blackened area of the glass absorbs substantially all of the stray light in the lens caused by reflection off of the lens surfaces. By means of the method of this invention a blackened area is formed which extends approximately 0.020–0.030 inch into the glass. This depth is sufficient to reduce stray light for most lens systems. However, the depth may be increased for specific applications. The blackened area is highly absorbent to all wavelengths including the red or 600 nm to 1000 nm range.

There will also be no reflection of light off of the clear glass/blackened glass interface since the indices of refraction of both areas are identical. Thus, all of the photons striking the interface will enter the absorbing layer.

In addition, photons that would normally scatter off the edge of the lens or lens barrel are substantially absorbed by means of the blackened area.

Yet another advantage of this invention is that scatter of photons off of the microstructure of the lens surfaces (edge scatter) is highly reduced since the glass is brought to a temperature at which the glass starts to flow, thereby curing any microcracks and defects which are present in the glass. This is referred to a "fire-polishing."

FIG. 4 (a)–(d) illustrates one method of producing an attenuating "blackened" area around the edge circumference of a lens. This method is referred to as the "brute force" method and is one of the easiest to perform.

A glass blank 40 is placed in a furnace 42. For this particular example, Corning 7056 glass was used for the glass blank. Corning 7056 glass comprises 70 percent silica ($SiO_2$), 17 percent boric oxide ($B_2O_3$), 8 percent potash ($K_2O$), 3 percent alumina ($Al_2O_3$) and 1 percent each of soda ($Na_2O$) and lithium oxide ($Li_2O$). The air in the furnace is removed by a vacuum system. This permits the furnace to be checked for leaks and also removes any oxygen in the furnace to prevent a reaction between the oxygen in the air and the hydrogen gas which is introduced into the furnace. Hydrogen gas ($H_2$) is admitted into the furnace 42 until a pressure in the range of 25 psi or approximately 1.7 atmospheres is attained. Higher pressures will speed the reaction and are within the scope of this invention.

After the desired hydrogen pressure is reached, the temperature in the furnace is elevated to fire the glass and cause a reaction between the hydrogen gas and the oxygen ($O_2$) in the glass blank. The hydrogen reduction begins in the outer surface of the glass blank 40 and proceeds inwardly. The hydrogen reacts with the oxygen of the metal oxide of the glass material to form water, leaving the metal oxide in a reduced form in the glass. The metal oxide may be reduced completely, leaving the metal in its elemental state. The blackening of the glass is a combined function of the absorption coefficient and the thickness of the absorption layer. The water resulting from the reduction is baked out of the glass.

The higher the temperature and the higher the hydrogen pressure, the faster the reduction reaction will occur. Also at high temperatures and pressures, the blackening will continue deeper into the glass. In addition, higher hydrogen pressure increases the energy level of the gas resulting in more of the metal oxide being reduced per unit area than at lower pressures. Thus, the light absorbing capability of the area is greatly increased.

The time, temperature and pressure may be adjusted to satisfy the depth requirements for the particular application of the lens system. In addition, adjustments to the firing parameters may be necessary for different types of glasses.

However, temperatures near the softening point of a glass and long term exposure of the glass to the high temperatures will cause some glass to "slump". For example, Corning 7056 glass will slump excessively for firing temperatures above 680° C. and for time periods longer than 48 hours. For this glass it has been found that a firing temperature of approximately 640° C. and a firing time of approximately 48 hours will substantially eliminate this problem and produce a blackened area to a depth in the range of 0.020-0.030 inch which is suitable, for example, for forming a light absorbing area in a glass faceplate for an image intensifier tube. The same depth and degree of blackening was achieved in the faceplate using the 25 psi hydrogen gas pressure, with a temperature of 620° C. for 72 hours. The 640° C./48 hour parameters are desirable, however, because of the increase in production of the faceplates using Corning 7056 glass which is obtainable with the shorter firing time. For each glass type that is to be fired, suitable firing parameters will need to be experimentally determined.

Following the firing of the glass blank, the lens radii are ground and polished until no blackening is left on most of the radii surfaces as shown in FIG. 4(d).

The process may be modified to minimize the time needed for the post firing grinding and polishing of the lens radii.

Reference is now made to FIG. 5 (a)–(e). In the modified version a mask is applied to the surfaces which will eventually form the light receiving and transmitting surfaces 52, 53, respectively. The mask 54 is applied to the glass blank 50 either before (FIG. 5(a)) or after (FIG. 5(b)) the radii are rough ground. It has been found that silicon nitride ($Si_3N_4$) produces an excellent mask.

The mask 54 may be deposited in any known manner. Some examples of mask formation methods are sputter deposition and plasma deposition.

In one method of mask formation, the surface or surfaces to which the mask will be applied is cleaned by sputter etching. The silicon nitride is then applied by reactive sputtering. A preferred thickness for the mask is 500 nm.

Once the mask 54 is deposited, the blank 50 is placed in a furnace 56 and the firing proceeds as described above, using a temperature of approximately 640° C. and a hydrogen pressure of 25 psi for 48 hours. After the firing has taken place, the mask 54 is removed from the radii surfaces by grinding and polishing, leaving the blackened area on the surfaces which are a source of stray light.

In another form of the brute force method, the light absorbing capability of the blackened area may be effectively increased by diffusing a metallic compound, such as a metal oxide or metal salt, into the glass prior to the reduction step. In this method, the optical material is heated to its softening point and placed in an atmosphere of, for example, silver oxide. At an elevated temperature, the silver ions diffuse into the optical material and react with the oxygen in the glass forming metal oxides in addition to the metal oxides already present in the glass material. The hydrogen reduction is then performed.

By introducing additional metal oxides into the glass, a greater concentration of reduced metal oxides will be present per unit area, resulting in enhanced light absorbing capability. The depth of the light absorbing area may therefore be reduced while still achieving the same level of light absorption.

Reference will now be made to FIG. 6 (a)–(d). In this modification, the material of a glass blank 60 is a porous glass. In porous glasses, which have air pockets throughout the silica material, hydrogen diffusion occurs rapidly throughout the glass and is very difficult to control. In order to provide better regulation of the blackening depth, a cladding glass 62 is positioned around the entire blank 60 prior to firing. The cladding glass 62 has a softening point which is the same as that of the porous glass. The refractive index of the cladding glass may be similar to that of the porous glass, but it is not essential that it be the same. The reaction is allowed to continue until the blackening layer 64 extends through the thickness of the cladding glass. The surfaces 66 are then ground and polished to remove the blackened layer and to form the lens radii.

FIG. 7 shows an alternate method of practising the invention. Instead of using a glass blank which has already been machined oversize to the general configuration of a finished product, a disk or block of optical material may be both molded and hydrogen reduced in one operation. Additional advantages result from this method. Since a machined blank is not required, a flat disk of fairly loose tolerances can be used. The mold may have an internal configuration to form plano-convex, plano-concave or any convex-concave combination. In addition, hydrogen firing times are extremely short.

Figure 7A:
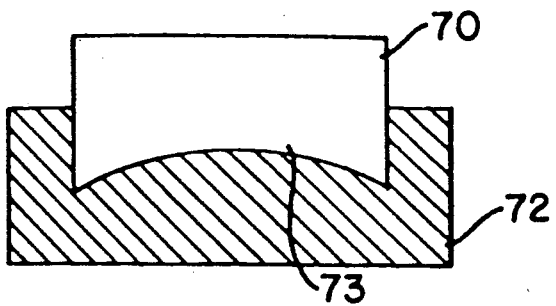
FIGS. 7(a)–(d) is a diagrammatic representation of an alternative method of the present invention.
Figure 7B:
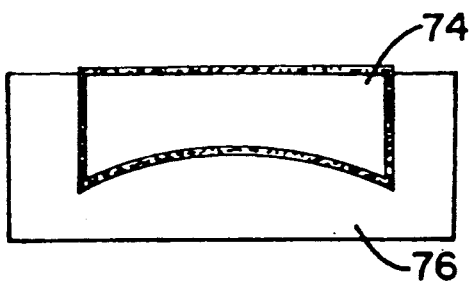
Figure 7C:
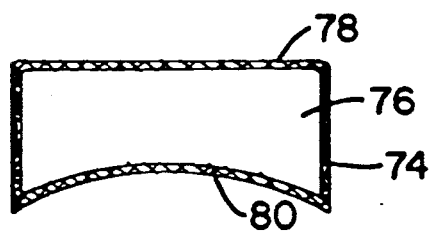
Figure 7D:
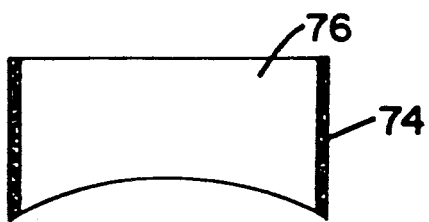

Referring to FIG. 7(a), a flat disk of optical material 70 is placed on a mold form 72. The mold 72 should be of sufficient size to allow grinding of the formed lens to a finished product. The mold is formed of a hydrogen permeable material such as graphite or ceramic. The mold and disk are placed in a furnace and hydrogen fired at a temperature high enough to allow the glass to flow and cause the hydrogen reduction to occur. For example, Corning 7056 glass is hydrogen fired and reduced at approximately 800° C. for four hours. At this temperature the optical material flows to the shape of the mold and at the same time the outer surfaces (74) of the optical material become blackened as shown in FIG. 7(b). Following cooling of the formed lens 76, the surfaces 78, 80 which will receive and transmit light are ground to remove the blackened areas and to achieve the final faceplate dimensions. The surface 73 of the mold may be formed with a layer of material which is not permeable to hydrogen such as silicon nitride or boron nitride. The areas which are ground are indicated by hatch marks in FIG. 7(c). In this way the surface 80 of the formed lens will not need to be ground, further reducing processing time and cost. The finished faceplate is shown in FIG. 7(d).

This alternate method of processing Corning 7056 glass results in a blackened layer transmission as low as 0.1% compared to approximately 1.0% transmission for firing at 640° C. for 48 hours.

While the principles of the invention have been described in connection with specific apparatus and methods, it is to be clearly understood that this description is made only by way of example and not as a limitation to the scope of the invention as set forth in the objects thereof and in the accompanying claims.

What is claimed is:

1. A method of making a lens which is to be supported in a lens retaining structure by an outer diameter surface thereof, comprising the steps of:

providing a lens made of an optical material of a glass composition including a metal oxide incorporated in the glass matrix, said lens having an optical axis in one direction and light receiving and transmitting surfaces having respective radii of curvature centered on the optical axis to provide said lens with a selected optical power, said lens further having its outer diameter surface by which it is to be supported in a lens retaining structure positioned between said light receiving and transmitting surfaces; selecting a position for at least one light absorbing area along said outer diameter surface of said lens for reducing stray light reflected into the lens through any of said light receiving or transmitting surfaces and said outer diameter surface after reflection off of the lens retaining structure by which the lens is to be supported; and forming a reduced metal oxide in an interstitial phase within the glass matrix in at the selected position for said at least one light absorbing area for the lens, by reducing the metal oxide of the optical material of the lens in hydrogen at a pressure above one atmosphere and at an elevated temperature, such that said light absorbing area extends inwardly from the outer diameter surface of the lens to a depth sufficient to reduce stray light reflected into the lens, and baking the by-product water, resulting from the reducing step, out of the optical material.

2. The method of claim 1 wherein the forming step includes reducing the metal oxide to an elemetal metallic state.

3. The method of claim 1 further comprising the step of increasing the amount of metal oxide in the optical material prior to the forming step.

4. The method of claim 3 wherein the increasing step includes
heating the optical material to its softening point; and
placing the softened optical material in the presence of a metal compound at a temperature which will cause the metal ions of the compound to enter the optical material and react with the oxides therein forming metal oxides.

5. The method of claim 1 further comprising the step of removing the reduced-metal-oxide layer in at least one area of the outer surface in order to permit light to be received and transmitted therethrough.

6. The method of claim 5 wherein the removing step includes grinding and polishing.

7. The method of claim 1 further comprising the step of positioning a masking layer on at least one section of the outer surface of the lens prior to said forming step.

8. The method of claim 7 further comprising the step of removing the surface of the lens from the section prior to said positioning step.

9. The method of claim 7 wherein the positioning step includes sputter deposition.

10. The method of claim 7 wherein the positioning step includes plasma deposition.

11. The method of claim 7 wherein the positioning step includes depositing silicon nitride to a depth of 500 nm.

12. The method of claim 1 further comprising the step of making a lens of a porous optical material.

13. The method of claim 12 further comprising the step of surrounding the lens with a cladding material formed of a non-porous optical material prior to said placing step.

14. A method of forming a lens comprising the steps of:
providing a mold having an opening therein having a shape which conforms substantially to the configuration of a lens;
placing a blank of optical material of a glass composition including a metal oxide in the glass matrix on the mold and extending over the opening;
subjecting the blank and the mold to a reducing environment of hydrogen gas at a pressure above one atmosphere and to heating at an elevated temperature;
bringing the temperature of the hydrogen and blank to a level at which the optical material softens and flows into and fills the shape of the opening and, at the same time, the hydrogen reacts with the metal oxide in the optical material of the blank to form a light absorbing area of reduced metal oxide extending from the outer surface of the blank into the optical material to a depth sufficient to reduce stray light which is reflected in the optical material.

15. The method of claim 14 wherein the bringing step includes reducing stray light to approximately 0.1%.

16. The method of claim 14 wherein the providing step includes making at least one portion of the mold of a hydrogen permeable material.

17. The method of claim 16 wherein the making step includes selecting graphite as a hydrogen permeable material.

18. The method of claim 16 wherein the making step includes selecting ceramic as a hydrogen permeable material.

19. The method of claim 14 further comprising the step of removing a portion of the area in order to permit light to be received and transmitted therethrough.

20. The method of claim 14 wherein the placing step includes forming an optical material comprising 70 percent silica, 17 percent boric oxide, 8 percent potash, 3 percent alumina and 1 percent each of soda and lithium oxide.

21. The method of claim 20 wherein the subjecting step includes establishing a pressure in the range of 25 pounds per square inch.

22. The method of claim 21 wherein the bringing step includes elevating the temperature to 800° C.

23. The method of claim 22 further comprising the step of maintaining the temperature and pressure at the elevated levels for four hours to form an area extending to a depth of approximately 0.020–0.030 inch.

* * * * *